United States Patent [19]

Campbell

[11] Patent Number: 4,581,668
[45] Date of Patent: Apr. 8, 1986

[54] DISK CONTOUR COVER HAVING AIR FILTRATION SECTION

[75] Inventor: Ian N. Campbell, Invergowrie, Scotland

[73] Assignee: Burroughs Corp., Detroit, Mich.

[21] Appl. No.: 596,343

[22] Filed: Apr. 3, 1984

Related U.S. Application Data

[63] Continuation of Ser. No. 359,978, Mar. 19, 1982, abandoned, Ser. No. 168,826, Jul. 10, 1980, abandoned, Ser. No. 55,113, Jul. 5, 1979, abandoned, Ser. No. 920,909, Jun. 29, 1978, abandoned.

[30] Foreign Application Priority Data

May 16, 1978 [GB] United Kingdom ............ 19720/78
Jul. 11, 1979 [GB] United Kingdom ............ 7924084

[51] Int. Cl.⁴ ............................................. G11B 5/012
[52] U.S. Cl. ....................................... 360/97; 360/133
[58] Field of Search ............ 360/97, 98, 99, 102–103, 360/133

[56] References Cited

U.S. PATENT DOCUMENTS

| | | | |
|---|---|---|---|
| 3,196,422 | 7/1965 | Cheney | 360/97 |
| 3,553,663 | 1/1971 | Scholz | 360/97 |
| 3,587,074 | 6/1971 | Angle et al. | 360/97 |
| 3,624,624 | 11/1971 | Johnson | 360/100 |
| 3,631,423 | 6/1969 | Groom | 360/97 |
| 3,710,540 | 1/1973 | Stansell | 55/473 X |
| 3,723,980 | 3/1973 | Gabor | 360/98 |
| 3,731,291 | 5/1973 | Walsh | 360/98 |
| 3,740,735 | 6/1973 | Gabor | 360/97 |
| 3,839,734 | 10/1974 | George et al. | 360/102 |
| 3,846,835 | 11/1974 | Horovitz | 360/98 |
| 3,846,837 | 11/1974 | Jacques | 360/99 |
| 4,008,492 | 2/1977 | Elsing | 360/133 X |
| 4,092,687 | 5/1978 | Butsch | 360/97 X |
| 4,130,845 | 12/1978 | Kulma | 360/97 |

*Primary Examiner*—John H. Wolff
*Attorney, Agent, or Firm*—Mark T. Starr; Kevin R. Peterson

[57] ABSTRACT

In a rotating disc information storage system, a cover is designed to induct laminary airflow at the disc surface and to reduce the impurity level of the disc atmosphere. The laminar airflow results from the shape of the cover which closely conforms to the contours of the disc and its drive spindle and is closely spaced thereto. The impurity level is reduced by the spiral airflow produced by disc rotation being provided to a divergent filter duct and filter to capture airborn particles. The divergent filter duct and opening to the duct are formed between the cover and a wall around the periphery of the disc. The position of the wall is mechanically adjustable to control the spiral airflow into the filter duct. Air is filtered and returned to the disc storage system.

8 Claims, 6 Drawing Figures

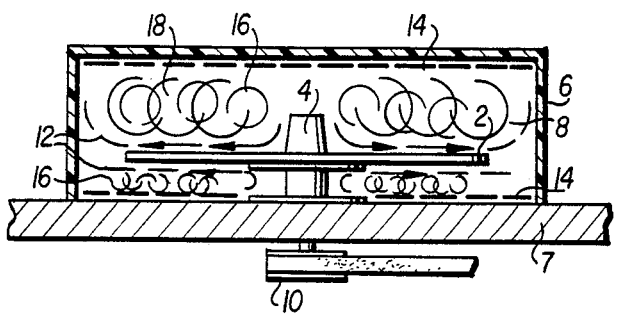
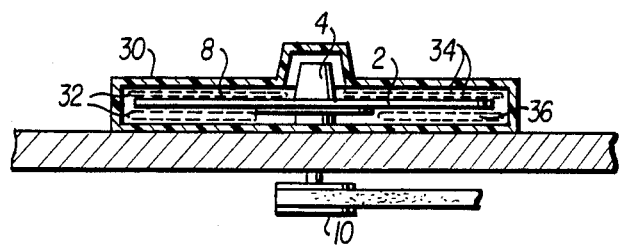
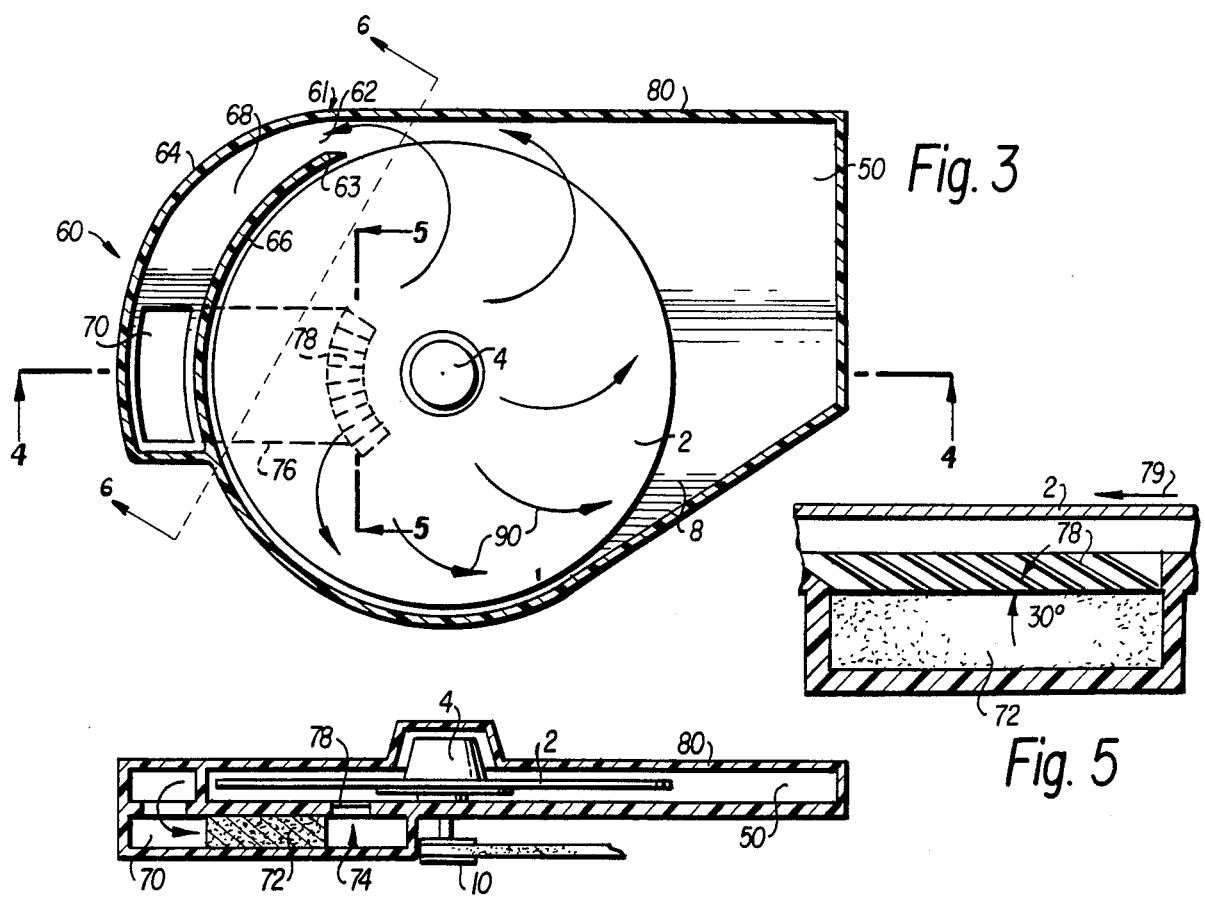

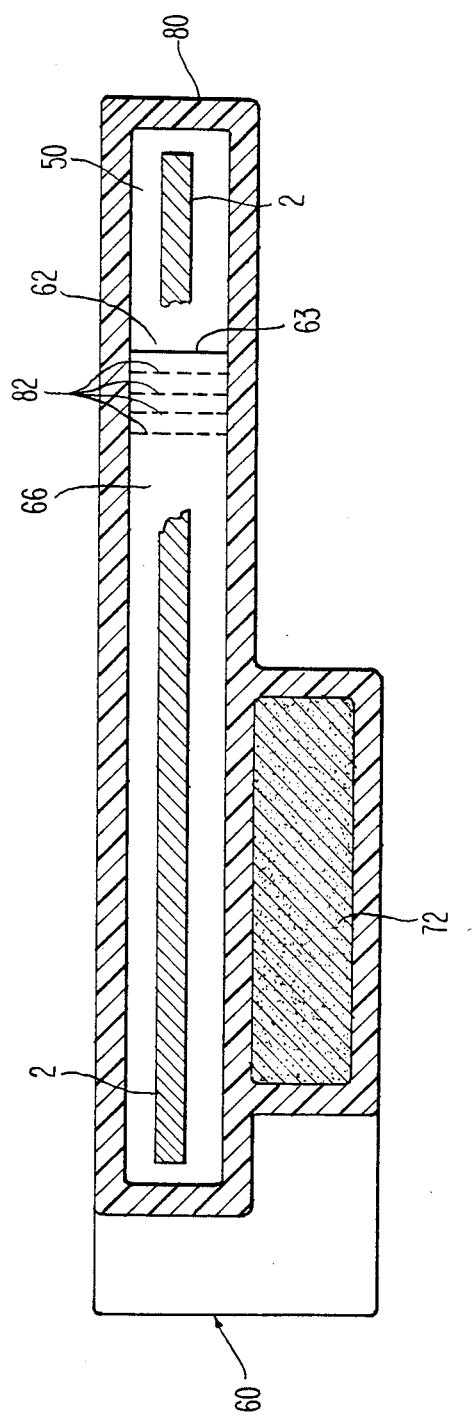

DISK CONTOUR COVER HAVING AIR FILTRATION SECTION

This is a continuation of application Ser. No. 359,978, filed Mar. 19, 1982, now abandoned; Ser. No. 168,826, filed July 10, 1980, now abandonded; Ser. No. 055,113, filed July 5, 1979, now abandoned; Ser. No. 920,909, filed June 29, 1978, now abandoned.

The invention relates generally to enclosures for rotating disk information storage devices. In particular, the invention relates to those enclosures which not only produce laminar flow at the disk surface but also reduce the impurity level of the disk atmosphere.

The desirability of laminar airflow and of purified atmospheres for disk information systems has been demonstrated by the prior art where numerous individual techniques have been attempted to achieve isolated advantages.

For example, in order to horizontally stabilize rotating flexible disks, laminar air patterns have been caused to flow over the disk surfaces by means of plates and air vents mounted on the disk hub.

For the purpose of removing contamination from the disk atmosphere, the prior art has exploited the phenomenon of outward-spiralling tangential airflow produced by disk rotation to capture air-borne particles at the disk's outer circumferance.

Finally, other patents demonstrate the use of disk enclosure housings making possible ease of handling as well as protection from external contamination.

Nowhere in the prior art, however, is a disk cover provided which, through the inducement of laminar airflow in the body of the cover, reduces disk atmosphere temperature conditions and disk rotation power drive requirements by being shaped to closely conform to the contours of the disk and its drive spindle. Nor does the prior art disclose a cover having a high degree of design simplicity which simultaneously provides numerous other features such as the removal of air-borne particles from the disk atmosphere by means of a divergent filter duct that utilizes tangential airflow produced by disk rotation, and the ability to alter the rate of airflow through the filter duct by the variation of one, simple mechanical parameter.

It is an object of this invention, therefore, to provide a disk cover that produces laminar airflow at the disk surface.

It is another object of this invention to provide a single unitary cover which produces laminar airflow while simultaneously removing impurities from the disk atmosphere.

It is an additional object of this invention to provide a laminar-airflow, impurity-removing unitary disk cover in which filtration-induced turbulence is minimized.

It is still further an object of this invention to provide such a cover having a high degree of design simplicity.

It is a final object of this invention to provide such a cover whose rate of airflow through filtration means is alterable by the adjustment of a single mechanical parameter.

These and other objects are achieved by the instant invention which uses a single cover having both close conformity to the contours of the disk and its drive spindle as well as a circumferentially-disposed divergent filter duct for capturing tangentially-directed disk atmosphere impurities.

Other objects, features and advantages will be readily apparent from the following detailed description when considered with the accompanying drawings which show by way of example and not limitation the principles of the invention and a preferred mode of applying those principles.

FIG. 1 is a sectional view of a prior art housing for a rotating disk showing the associated atmospheric turbulence.

FIG. 2 is a sectional view of one embodiment of the instant invention showing the resulting laminar airflow.

FIG. 3 is a top plan view of one embodiment of the cover showing the tangential airflow divergent filter duct, and transducer actuator area.

FIG. 4 is a sectional view of FIG. 3 taken along line 4—4 showing cover conformity and filter air passage.

FIG. 5 is a sectional view of FIG. 3 taken along line 5—5 showing the louvered filter exit.

FIG. 6 is a sectional view taken along the sectional line shown in FIG. 3.

FIG. 1 shows a typical prior art disk cover. A rotating disk 2 is mounted on a spindle 4 and surrounded by both a cover 6 and a base 7 so as to enclose an amount of air as the disk atmosphere 8. Because of the excess space existing above and below the disk surface, turbulent airflow develops within the cover atmosphere, between the disk and the cover wall, as the disk rotates. The turbulence 16 is caused by a mixing between the moving air layers 12 and the still air 14 which stands near the surfaces of the cover 6 and the base 7. Components of this turbulence 16 include eddy currents 18. As a result of the turbulence, the temperature rise time and the absolute temperature of atmosphere 8 are increased. Also, greater motor power for the rotation power source 10 is required.

One particular embodiment of the contoured cover of the present invention is displayed in FIG. 2. As in the prior art, a rotatable disk 2 mounted on a spindle 4 and driven by a rotation power source 10 is enclosed within a housing 30. This housing, however, closely conforms to the natural contours of the disk and its spindle. Spindle 4, as well as other associated elements, can be specially designed to further improve the cover-to-disk system interface.

As a result of the close conformity, laminar flow regions 32 develop above and below the surfaces of the disk. In these laminar flow regions, rotating central cores 36 circulate within boundary layers 34. Because the airflow is laminar, there is less turbulence in disk atmosphere 8. This, in turn, reduces the disk atmosphere's temperature rise time and absolute temperature, as well as the power requirements of rotation power source 10.

FIG. 3 shows one embodiment of another aspect of this invention in which a single cover 80 is not only configured to match the natural contrours of the disk and the drive spindle, but is also designed to contain a circumferential filter 60 and an actuator area 50. A disk 2, mounted on a spindle 4, and rotated by an appropriate rotational power source not shown, induces a tangentially-directed airflow generally designated by the arrows 90. Contaminants within the disk atmosphere 8 are carried by this outward-spiralling tangential airflow into the duct inlet 62 of circumferential filter 60. Circumferential filter 60 further includes an outer circumferential wall 64 and an inner circumferential wall 66, which together define a divergent filter duct 68. Inner wall 66 extends to a position such that interior edge 63 of duct inlet 62 is in proximity to exterior inlet edge 61. A divergent duct is used so as to increase a duct inlet 62 the difference between the atmospheric pressure within duct 68 and the pressure within disk atmosphere 8. The improved self-pumping action brought about by this enhanced pressure differential increases the airflow through circumferential filter 60. Filter inlet 70 is located at the extreme downwind portion of the divergent duct 68. Captured air passes from inlet 70, through filtration channel 76, to an area near the inner radii of the disk. The air then returns to the disk chamber through louvers 78. Actuator area 50 is included as part of the enclosure 80 so that the disk can be accessed by an appropriate transducer means while being rotated. The section designated by the line in FIG. 3 is shown in FIG. 6.

In FIG. 4, sectional view of FIG. 3 taken along line 4—4, the housing 80 is shown closely conforming to the contours of the disk 2 and its drive spindle 4. Area 50 appears as a horizontal space which allows access by the transducer arms. The duct inlet 62 extends both above and below the disk surface so that tangentially-directed particles on both sides of the disk surface can be captured. The particle-laden captured air flowing through inlet 62 is directed by duct 68 into filter inlet 70. As shown in FIG. 4, the captured air is then filtered by filter 72 before being redirected back into the disk chamber at filter exit 74. By deflecting the filtered air into existing flow patterns near the disk's inner radii, louvers 78 minimize the turbulent effects on the disk atmosphere caused by the reentry.

The configuration shown in the FIG. 5 cross-sectional view utilizes louvers 78 mounted four per inch, flush with the disk enclosure, and at a 30° angle with respect to horizontal. For the sake of clarity, only a few of these louvers have been included in the drawings. By slanting in the same direction 79 as that of disk rotation, louvers 78 direct the air exiting from filter 72 into existing flow patterns beneath disk 2.

The figures in combination demonstrate the manner in which circumferential filter, filter return passage, actuator area, and contour-cover concepts are combined in an essentially self-contained disk enclosure unit. The unit requires minimal interaction with external apparatus and provides decreased impurity levels, improved temperature characteristics, and reduced rotational drive power consumption.

A further property of the present invention may be seen from FIG. 3.

In order that the circumferential filter (60) may remove particles from the airflow through it, at greatest efficiency, it is necessary for the rate of airflow to be at an optimum value. Below the optimum value of flow, the air does not circulate at sufficient speed for the larger particles to be carried into the filter (60). Above the optimum rate of flow, the air passes through the filter (60) at such speed that the smaller particles cannot settle within the filter (60).

It is seen that the self-purging action of the system is dependent on the rate of flow through the filter (60). The rate of flow may be varied simply by extending or reducing the amount that the inner wall (66) extends around the disc (2). In this way, the angle and size of the inlet duct (62) is varied. The pressure across the filter (60) is responsive to this variation. The rate of flow, through the filter, being a function of the pressure, the flowrate through the filter (60) is also responsive to the variation.

The adjustments described above may be achieved either in design or by the inclusion of mechanically movable means. FIG. 6 shows the inner circumferential wall 66 which ends with edge 63. Dashed lines 82 show various example positions to which the edge 63 of the wall 66 may be extended to control the flow of air into duct inlet 62. The wall 66 may be molded to the correct size for the desired air flow and fastened into place in enclosure 80. The disc 2 is shown as partially cut away. This technique is used to make the cover for the Burroughs 3/6 megabyte floppy disc drive, (model 9489).

As a result of this property, different types of filters (60) having differing optimum flowrates, may be accommodated within any one particular configuration of the present invention, at their optimal flowrates, by the simple expedient of the alteration of the extent that the inner wall (66) extends around the rotating disc (2) for each type of filter.

The preceding detailed description has presented merely a preferred embodiment of the claimed invention. It will be understood, of course, that numberous other alternative embodiments encompassing many variations in the covers and filters shown could be employed without departing from the spirit and scope of the invention as set forth in the appended claims.

I claim:

1. A contamination excluding system for an enclosed rotary informational disc system comprising:
    a disc on a spindle wherein said disc acts as a centrifugal fan, for driving air around a spiral flow path within a cover which is matingly contoured around said disc, a filter duct receiving said flow of air, a filter inlet at the end of said filter duct for allowing the flow of air to leave said filter duct, said filter inlet located outside the periphery of said disc, an air filter receiving said flow of air from said filter inlet and filtering said air, a filter exit for dispensing said filter air to said spindle, said filter duct having mechanically adjustable means for controlling the duct and flow of air into said filter duct to establish a pressure at said filter inlet to obtain the flow of air through said filter necessary for optimum filtration.

2. A system according to claim 1 wherein said filter inlet is remote from said constricted opening of said filter duct and wherein said filter duct is tapered to have a larger cross sectional area at said filter inlet than at said constricted opening.

3. A system according to claims 1 or 2 wherein said cover is conformal with and closely spaced from the upper and lower contours of said disc to minimize the air turbulance.

4. A system according to claim 3 wherein said enclosure comprises a base for supporting said spindle and a cover for attachment to said base.

5. A system according to claim 4 wherein said means for controlling the flow of air is integral with said cover.

6. A system according to claims 1 or 2 wherein said filter exit has one or more louvres covering it for directing the air from said duct back into said housing confluently with the air flowing in said housing proximatly to said second port.

7. A system according to claim 1 wherein the circumferential extent of said means for controlling the flow of air about said medium is adjustable to vary the rate of flow of air through said filter in said conduit.

8. A contamination excluding system for a rotary information disc, said system including a disc on a spindle, said disc being usable as a centrifugal air pump, and said system comprising:
- a base, through-penetrated by said spindle;
- a cover which is matingly contoured around said disc, affixable to said base to provide a cover for said disc;
- a filter duct extensive between said cover and said base and defining a duct and a duct inlet for receiving a spiral flow of air pumped by said disc into said filter duct;
- a filter inlet through-penetrating said base within said filter duct at a distance from said spindle greater than the radius of said one disc;
- a filter exit through-penetrating said base substantially adjacent to said spindle;
- a conduit for conducting air from said filter inlet to said filter exit;
- a filter in said conduit for removing particles of greater than a predetermined size from the air passing through said conduit; and,
- mechanically adjustable means for controlling the duct and flow of air into said filter duct to establish a pressure at said filter inlet to obtain the flow of air through said filter necessary for optimum filtration.

* * * * *